US008342797B2

(12) United States Patent
Kwon et al.

(10) Patent No.: US 8,342,797 B2
(45) Date of Patent: Jan. 1, 2013

(54) COOLED GAS TURBINE ENGINE AIRFLOW MEMBER

(75) Inventors: Okey Kwon, Indianapolis, IN (US); Ted Freeman, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 628 days.

(21) Appl. No.: 12/550,810

(22) Filed: Aug. 31, 2009

(65) Prior Publication Data

US 2011/0052413 A1    Mar. 3, 2011

(51) Int. Cl.
*F01D 5/18*    (2006.01)

(52) U.S. Cl. ............... 415/115; 415/178; 416/97 R

(58) Field of Classification Search ............ 415/115, 415/178; 416/96 R, 97 R
See application file for complete search history.

(56) References Cited

U.S. PATENT DOCUMENTS

| | | | |
|---|---|---|---|
| 2,780,435 A | 2/1957 | Jackson | |
| 2,866,618 A | 12/1958 | Jackson | |
| 3,574,481 A | 4/1971 | Pyne, Jr. et al. | |
| 3,656,863 A | 4/1972 | De Feo | |
| 3,778,183 A | 12/1973 | Luscher et al. | |
| 3,963,368 A | 6/1976 | Emmerson | |
| 4,135,855 A | 1/1979 | Peill | |
| 4,415,310 A | 11/1983 | Bouiller et al. | |
| 4,542,867 A | 9/1985 | Memmen | |
| 4,616,976 A | 10/1986 | Lings et al. | |
| 5,246,340 A | 9/1993 | Winstanley et al. | |
| 5,695,321 A * | 12/1997 | Kercher ............... | 416/97 R |
| 5,980,209 A | 11/1999 | Barry et al. | |
| 5,993,156 A | 11/1999 | Bailly et al. | |
| 6,086,328 A | 7/2000 | Lee | |
| 6,135,715 A | 10/2000 | Correia | |
| 6,190,128 B1 | 2/2001 | Fukuno et al. | |
| 6,227,798 B1 | 5/2001 | Demers et al. | |
| 6,499,950 B2 | 12/2002 | Willett et al. | |
| 6,695,582 B2 | 2/2004 | Bunker et al. | |
| 6,761,534 B1 | 7/2004 | Willett | |
| 6,769,875 B2 * | 8/2004 | Tiemann ............... | 416/97 R |
| 6,910,864 B2 | 6/2005 | Tomberg | |
| 7,549,843 B2 * | 6/2009 | Liang .................. | 416/97 R |
| 7,674,092 B2 * | 3/2010 | Annerfeldt et al. ...... | 416/97 R |
| 7,857,588 B2 * | 12/2010 | Propheter-Hinckley et al. ............... | 416/96 A |
| 2002/0141868 A1 | 10/2002 | Lee et al. | |
| 2002/0187039 A1 | 12/2002 | Rinck et al. | |
| 2007/0172354 A1 * | 7/2007 | Annerfeldt et al. ...... | 416/97 R |

FOREIGN PATENT DOCUMENTS

JP    62271902    * 11/1987

OTHER PUBLICATIONS

Shizutani et al., Cooled Blade for Gas Turbine, Nov. 26, 1987, Abstract of JP 62271902.*

* cited by examiner

*Primary Examiner* — Edward Look
*Assistant Examiner* — Liam McDowell
(74) *Attorney, Agent, or Firm* — Krieg DeVault LLP

(57) ABSTRACT

In one embodiment, a gas turbine engine turbine flow member is described that contains a passageway having a flow obstruction that forms a tortuous passageway for the passage of a cooling fluid. The flow obstruction can include flow structures disposed toward either side of the passageway. In one non-limiting embodiment a flow structure can have a V-shape, and in another non-limiting embodiment the flow structure can have an elongate shape. As cooling fluid flows through the passageway it is encouraged to flow up, down, and/or along portions of the flow obstruction.

22 Claims, 3 Drawing Sheets

COOLED GAS TURBINE ENGINE AIRFLOW MEMBER

FIELD OF THE INVENTION

The present invention generally relates to gas turbine engine blades and vanes, and more particularly, but not exclusively, to cooled gas turbine blades and vanes.

BACKGROUND

Cooled gas turbine engine vanes and/or blades remain an area of interest for improving gas turbine engine integrity and performance. Unfortunately, some existing systems have various shortcomings relative to certain applications. Accordingly, there remains a need for further contributions in this area of technology.

SUMMARY

One embodiment of the present invention is a unique cooled gas turbine engine blade and/or vane. Other embodiments include apparatuses, systems, devices, hardware, methods, and combinations for actively cooling blades and/or vanes. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
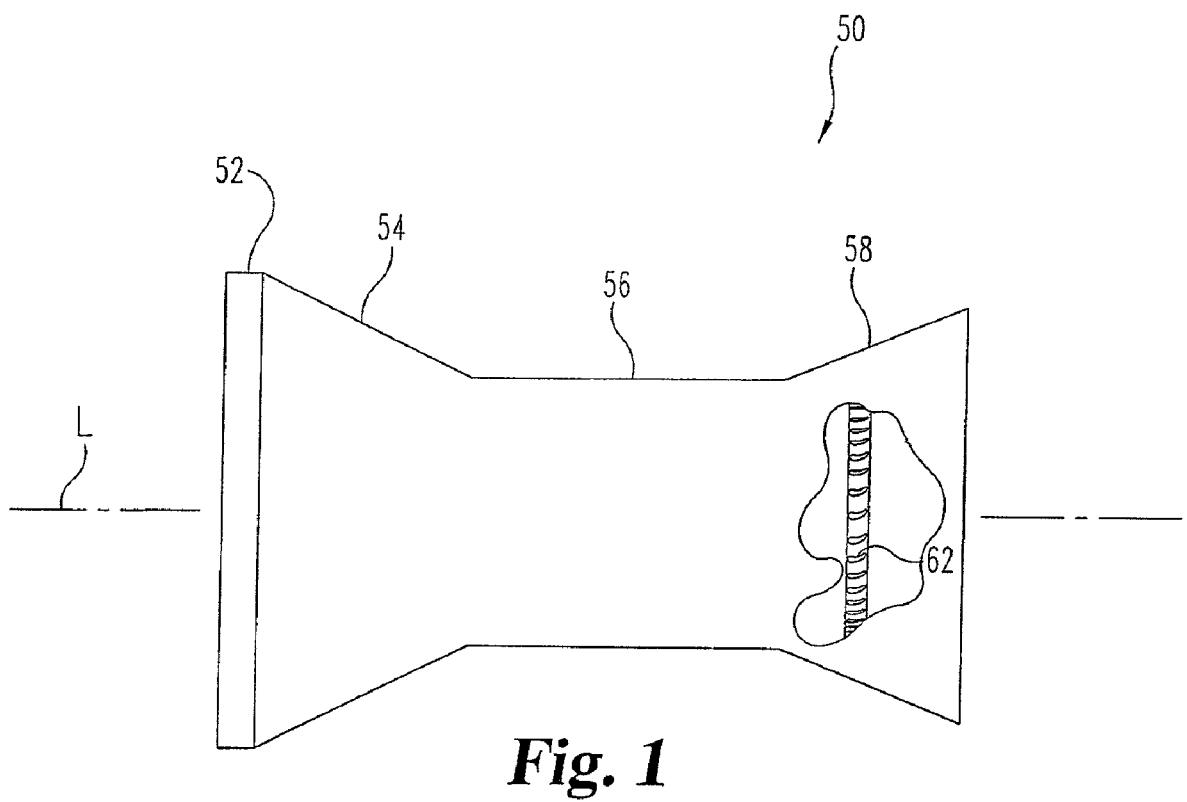
FIG. 1 depicts a schematic of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is depicted a schematic illustration of a gas turbine engine 50 useful to provide power for an aircraft. The term aircraft includes, but is not limited to, airplanes, unmanned space vehicles, fixed wing vehicles, variable wing vehicles, unmanned combat air vehicles, tailless vehicles, and others. Further, the present inventions are contemplated for utilization in other applications that may not be coupled with an aircraft such as, for example, industrial applications, power generation, pumping sets, naval propulsion and other applications known to one of ordinary skill in the art.

In one form, the gas turbine engine 50 includes a longitudinal axis L extending generally along the gaseous flow stream and has an annular configuration; however, other configurations are also contemplated as would occur to one of ordinary skill in the art. The gas turbine engine 50 of the illustrative embodiment includes a fan section 52, a compressor section 54, a combustor section 56, and a turbine section 58 integrated to produce an aircraft flight propulsion engine. This particular form of a gas turbine engine is generally referred to as a turbo-fan. In other embodiments the gas turbine engine 50 can take the form of a turbojet, to set forth just one non-limiting example.

The turbine section 58 includes a rotor having a plurality of turbine flow members 62 coupled thereto. The rotor is affixed to a shaft (not shown) which is rotatably mounted within the gas turbine engine 50. A plurality of turbine vanes (not shown) are positioned adjacent the turbine flow members 62 to direct the flow of gaseous fluid through the turbine section 58. In a preferred embodiment, the gaseous fluid is air; however, the present invention also contemplates other gaseous fluids.

Figure 2:
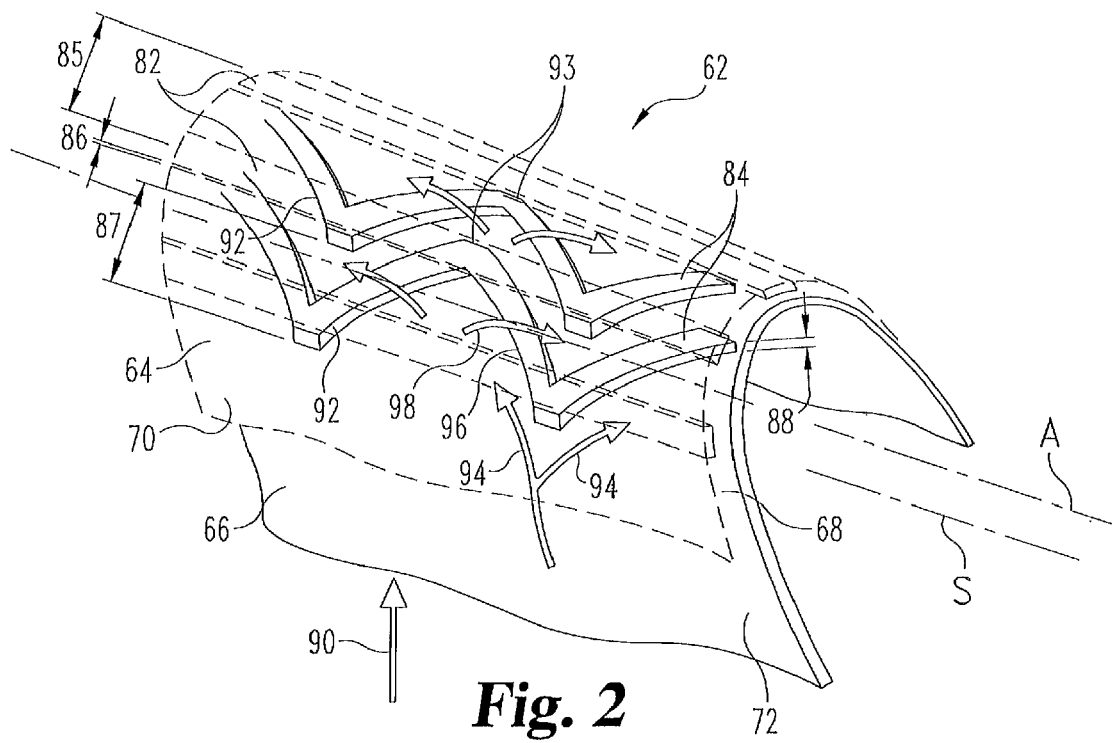
FIG. 2 is a view of one embodiment of a cooled turbine member.

Referring to FIG. 2, there is illustrated a perspective view of the turbine flow member 62. In one form the turbine flow member 62 can be a turbine vane. The turbine flow member 62 includes an outer structure 64 and an inner structure 66 that is oriented along a stacking axis S of the turbine flow member 62. The outer structure 64 is shown in phantom to better illustrate additional details of the turbine flow member 62. The terms "outer" and "inner" are relative terms and are not meant to necessarily indicate the outermost structure or the innermost structure of the turbine flow member 62. However, in some forms the outer structure 64 can be the outermost structure of the turbine flow member 62, and the inner structure 66 can be the innermost structure. The outer structure 64 can take the form of an airfoil shape, among other possible shapes. Additionally and/or alternatively, the inner structure 66 can take the form of a tube, among other possible shapes.

A passageway 68 is formed between an inside surface 70 of the outer structure 64 and an outside surface 72 of the inner structure 66. Cooling fluid, such as, but not limited to air, can be supplied through the passageway 68 at a variety of flow rates, temperatures, and pressures.

A flow obstruction is disposed between the outer surface 72 and the inner surface 70 and is used to promote movement of the cooling fluid, turbulence in the passageway 68, and/or improve heat transfer to assist in cooling the turbine flow member 62. As cooling fluid flows through the passageway 68 it is encouraged to flow over, under, along, and/or around the flow obstruction. In one form the flow obstruction includes flow structure 82 and flow structure 84. In the illustrative form the flow structure 82 is located on the inside surface 70 of the outer structure 64 and the flow structure 84 is located on the outside surface 72 of the inner structure 66. The flow structure 82 and/or flow structure 84 can take the form of a rib.

In some embodiments the flow structures 82 and 84 can be disposed on either or both the suction side and pressure side of the turbine flow member 62 and furthermore can wrap around the leading edge of the turbine flow member 62. In some alternative embodiments, the flow structures can be located in separate distinct groupings around the turbine flow member 62 depending upon the needs of any given application.

In the illustrative form the flow structures 82 are quadrilateral in cross-sectional shape and are elongate and parallel with the stacking axis S. The flow structures 82 can extend from the root to the tip of the turbine flow member 62. The quadrilateral shape can be rectangular or square, to set forth just two non-limiting examples. In some embodiments each of the flow structures 82 can be oriented at a common angle relative to the stacking axis S, can be grouped together at common angles, or each of the flow structures 82 can have a unique angle relative to the other flow structures 82 altogether. In some embodiments, the flow structures 82 can additionally have sectional lengths that are oriented at varying angles relative to the stacking axis S. For example, a portion of the flow structure 82 can have a first angle relative to the stacking axis S, while another portion of the flow structure 82 can have another angle. Each of the flow structures 82 is spaced apart from the other flow structures by a distance 85, but in some embodiments the distances between the neighboring flow structures 82 can be unequal. The flow structures 82 extend into the passageway 68 a height 86 but in one form do not extend a distance sufficient to contact the inner structure 66. In some applications, however, the flow structures 82 can extend various distances into the passageway 68 and can contact the inner structure 66 at some portions along the length of the flow structures 82. The flow structures 82 can have unique characteristics, either as groupings or individually.

The flow structures 82 also contact, or can be formed integral with, overlapping portions of the flow structures 84. In some embodiments, the overlapping portions of the flow structures 82 and 84 can take a variety of forms, some of which can be different than the union of their respective shapes. To set forth just one non-limiting example, the overlapping portions can take the form of a cylindrical post into which intersect the shapes of the flow structures 82 and 84. The size of the overlapping portions can vary from embodiment to embodiment or from location to location within any given turbine flow member 62.

In the illustrative form the flow structures 84 are quadrilateral in cross-sectional shape and are composed of piece-wise elongate sections such as to create a V-shape or repeating V-shapes. Each of the flow structures 84 is spaced a distance 87 from the nearest other flow structure 84, but in some embodiments the flow structures can be spaced at unequal intervals. The flow structures 84 of the illustrative embodiment extend into the passageway 68 a height 88 but do not extend a distance sufficient to contact the outer structure 64. In some embodiments, however, the flow structures 84 can extend various distances into the passageway 68 and can contact the outer structure 64 at certain portions.

In the illustrative form the flow structures 84 have a shape similar to a V. Though not depicted in the illustrated embodiment, the V-shape can extend in whole or in part along the stacking axis S from the root to the tip of the turbine flow member 62. In addition, an elongate axis A on which the repeating V-shape pattern is disposed in the illustrative embodiment can be oriented at an angle relative to the stacking axis S, or alternatively, certain sectional lengths of the repeating V-shape pattern can be oriented at varying angles relative to the stacking axis S. The V-shape can take the form of a smooth, continuous curving shape such as a sinusoid or a combination of discontinuous V-shape and continuous shapes. As with the flow structures 82, the flow structures 84 can have unique characteristics, either as groupings or individually.

Each of the upstream apex 92 and downstream apex 93 of the flow structures 84 in the illustrative embodiment contacts the flow structures 82 thus creating a network of interconnected flow structures that can provide structural support for the turbine flow member 62. In some embodiments the network can resemble a lattice network. Different network configurations can also be possible, such as a right angle network where the flow structures are arranged orthogonal to each other. Other configurations are also contemplated herein. In some embodiments, the flow structures 84 can contact the flow structures 82 at places other than the upstream apex 92 and the downstream apex 93.

It will be understood that the flow obstruction can have a variety of forms. In one non-limiting example, the flow structures 82 can be disposed toward the inner structure 66. Any of the flow structures of the various embodiments described above may be disposed on either the airfoil side or the tube side. It is also possible in some embodiments that both sides of the passageway 68 can have similar shaped flow structures. Thus, no limitation is hereby intended by associating a particular shape of flow structure 82 and/or 84 to a particular side of the passageway 68.

In one non-limiting embodiment, the turbine flow member 62 is cast together with the passageway and flow obstruction. The turbine flow member 62 can be made of a variety of materials including ceramic and metallic.

As airflow 90 traverses the passageway 68 it negotiates the network of the flow structures 82 and the flow structures 84 and at least in some portions follows a tortuous path. The network can cause the airflow 90 to separate as well as to turn and/or undulate in different directions. A turbulent flow mixing action can be created to promote heat transfer. In the illustrative form when air approaches the upstream apex 92 of the flow structure 84 it is diverted under the flow structures 82 and along paths 94 roughly corresponding to the shape of the flow structure 84. The configuration of the flow structures 82 at the downstream apex 93 of the flow structure 84, and in particular the union made between the flow structures, creates an area blockage such that air is forced to flow up and over a leg 96 of the flow structure 84 in the direction of a flow 98. When air reaches an upstream apex 92 of another of the flow structure 84 oriented at a downstream location, the air again is forced under the flow structure 82 and along a path roughly corresponding to the shape of the flow structure 84. Thus in summary, the flow path created by the network forces air in a variety of directions including under, along, up, and over various sections of both the flow structures 82 and the flow structures 84.

Figure 3:
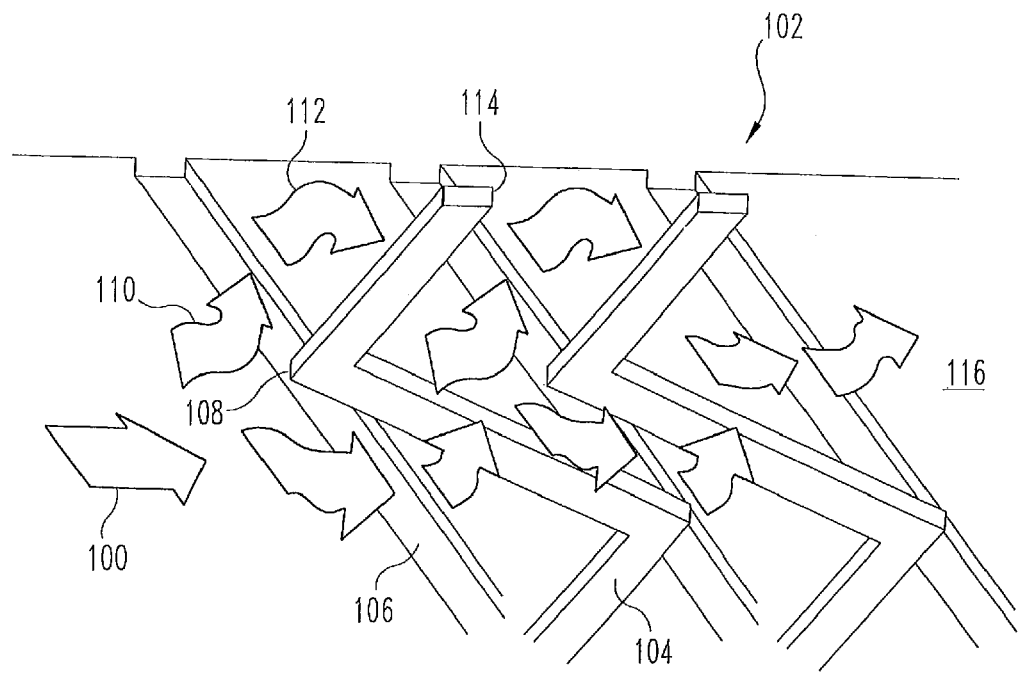
FIG. 3 is a view of one embodiment of a cooled turbine member.

Turning now to FIG. 3, another embodiment of the flow obstruction is illustrated. It will be understood that, although not shown, the flow obstruction is bounded on top and bottom by the outer structure 64 and inner structure 66, such that the flow obstruction is disposed within the passageway created between the outer structure 64 and inner structure 66. A flow of cooling fluid 100 is shown approaching a flow obstruction 102 that includes a flow structure 104 and a flow structure 106. As the flow of cooling fluid 100 encounters a pointed apex 108 in the illustrated embodiment it is forced to move in a direction 110 that includes moving up from the flow structure 106 and turning to the general direction of the flow structure 104. As the flow of cooling fluid 100 continues downstream it is encouraged to move in a direction 112 that includes moving down from the flow structure 104 and turning away from a downstream apex 114. The directions 110 and 112 are repeated downstream so long as the pattern in the flow obstruction is repeated. At a downstream point in the illustrated embodiment, however, the flow of cooling fluid enters a region 116 that is characterized by an absence of the flow structures 104 and 106. It will be understood that other flow directions may be created by altering the shape of the flow obstruction.

Figure 4:
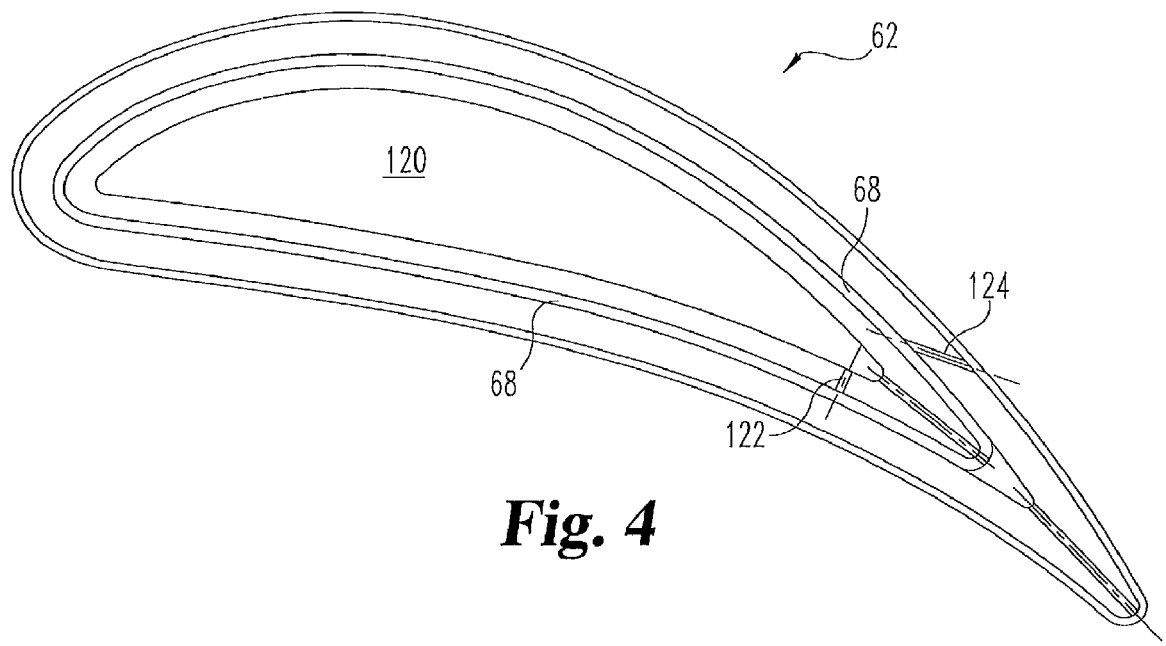
FIG. 4 is a view of one embodiment of a cooled turbine member.

Turning now to FIG. 4, a side view is depicted of one embodiment of the turbine flow member 62. The passageway 68 has been depicted without a flow obstruction to better illustrate a flow path of cooling fluid within the turbine flow member 62. The cooling fluid can be flowed from an internal cavity 120, through passage 122 located near the trailing edge of the pressure side of the turbine flow member 62 of the illustrative embodiment, and into the passageway 68. The cooling fluid then flows forward toward the leading edge and around to the suction side of the turbine flow member 62 until it is expelled from the turbine flow member 62 through passage 124 near the trailing edge. Other arrangements are contemplated in other embodiments and no limitation is intended regarding the origin of the cooling fluid, the location/size/numbers of initial passage(s) or aperture(s) into which the cooling fluid is introduced into the passageway 68, or the location/size/numbers of the final passage(s) or aperture(s) from which the cooling fluid is expelled from the turbine flow member 62.

One aspect of the present application provides a gas turbine engine turbine vane that includes a number of flow structures disposed in a cooling conduit that provide protruding structure for cooling air to traverse when flowing between within the conduit. One set of flow structures can be disposed to the airfoil side of the conduit and the other set of flow structures can be disposed to the interior side of the conduit and oriented at an angle relative to the flow structures disposed toward the airfoil side. Together the two sets of flow structures can create a flow obstruction and/or a network. Part of the airfoil side flow structures are in contact with part of the other flow structures. As cooling air traverses the conduit the flow obstruction encourages cooling fluid, such as air, to move and/or undulate as the air encounters a flow structure. For example, the cooling fluid is forced to undulate between sides of the conduit as it flows over and under the sets of flow structures, as well as undulate laterally as it encounters a flow structure or a relative angle of a flow structure or an angle made between the sets of flow structures.

Another aspect of the present application provides an apparatus comprising a gas turbine engine airflow device disposed within an annulus and having an airfoil shape, the gas turbine engine airflow device having a first internal surface and an opposing second internal surface forming an airflow passage, a plurality of first flow members disposed toward the first internal surface and a plurality of second flow members disposed toward the second internal surface, the first flow members and the second flow members structured to alter a flow of cooling fluid through the airflow passage, and wherein in operation a flow of cooling fluid through the airflow passage is caused to move away from the first internal surface and along and over one of the first flow members when encountering the one of the first flow members and to move away from the second internal surface and along and under one of the second flow members when encountering the one of the second flow members, the flow of cooling fluid along the one of the first flow members is in a different direction than a flow of cooling fluid along the one of the second flow members.

Yet another aspect of the present application provides an apparatus comprising an airflow member of a gas turbine engine protruding into a core flow path and operable to alter the direction of a core flow, the airflow member having an internal passage formed between a first wall and a second wall, the internal passage having a flow path for a cooling fluid, and a flow obstruction having a first portion disposed adjacent the first wall, extending toward the second wall, and oriented across the flow path of the internal passage, and a second portion disposed adjacent the second wall and extending toward the first wall, the first portion having a first segment coupled to a second segment of the second portion at an angle.

Still another aspect of the present application provides an apparatus comprising a gas turbine engine cooled airfoil having an internal passageway formed between a first wall and a second wall, wherein the internal passageway is structured to pass cooling air, and means for changing the direction of the cooling air in the internal passage.

Yet still another aspect of the present application provides a method comprising flowing a cooling air through a tortuous passage internal to a turbine airfoil component of a gas turbine engine, when encountering a first obstruction, turning the cooling air up and over the first obstruction, and when encountering a second obstruction, routing the cooling air down and under a second obstruction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a gas turbine engine airflow member disposed within an annulus and having an airfoil shape, the gas turbine engine airflow member having a first internal surface and an opposing second internal surface forming an airflow passage;
    a plurality of first flow obstructions disposed toward the first internal surface and a plurality of second flow obstructions disposed toward the second internal surface, the first flow obstructions and the second flow obstructions structured to alter a flow of cooling fluid through the airflow passage; and
    wherein in operation a flow of cooling fluid through the airflow passage is caused to move away from the first internal surface and along and over one of the first flow obstructions when encountering the one of the first flow obstructions and to move away from the second internal surface and along and under one of the second flow obstructions when encountering the one of the second flow obstructions, the flow of cooling fluid along the one of the first flow obstructions is in a different direction than a flow of cooling fluid along the one of the second flow obstructions.

2. The apparatus of claim 1, wherein the plurality of first flow obstructions is located between an exterior surface of the gas turbine engine airflow device and the plurality of second flow obstructions.

3. The apparatus of claim 1, wherein the airflow passage traverses from a trailing edge toward a leading edge on one side of the airfoil shape, around the leading edge and toward the trailing edge of another side of the airfoil shape.

4. The apparatus of claim 3, wherein the first flow obstructions and the second flow obstructions extend between the first internal surface and the second internal surface.

5. The apparatus of claim 4, wherein at least one of the first flow obstructions contacts at least one of the second flow obstructions.

6. The apparatus of claim 1, wherein the plurality of first flow obstructions includes at least one obstruction having a V-shaped portion.

7. The apparatus of claim 6, wherein the plurality of second flow obstructions includes at least one obstruction that is elongate.

8. The apparatus of claim 1, wherein the plurality of first flow obstructions is quadrilateral in cross-sectional shape.

9. An apparatus comprising:
an airflow member of a gas turbine engine protruding into a core flow path and operable to alter the direction of a core flow, the airflow member having an internal passage formed between a first wall and a second wall, the internal passage having a flow path for a cooling fluid; and
a flow obstruction having a first portion disposed adjacent the first wall, extending toward the second wall, and oriented across the flow path of the internal passage, and a second portion disposed adjacent the second wall and extending toward the first wall, the first portion having a first segment coupled to a second segment of the second portion at an angle,
wherein in operation a flow of cooling fluid through the internal passage is caused to move away from the first wall and along and over the first portion when encountering the first portion and to move away from the second wall and along and under the second portion when encountering the second portion, the flow of cooling fluid along the first portion being in a different direction than the flow of cooling fluid along the second portion.

10. The apparatus of claim 9, which further includes the first portion having a leading edge operable to split the flow path to either side of the first portion.

11. The apparatus of claim 10, which further includes the first portion having a trailing edge operable to split the flow path to either side of the first portion.

12. The apparatus of claim 9, wherein the flow obstruction provides structural strength to the airflow member.

13. The apparatus of claim 9, wherein the first portion contacts the second portion in a plurality of locations.

14. The apparatus of claim 9, wherein the cooling fluid flow path extends from a location in proximity to a trailing edge of the airflow member on one side of the airflow member, toward and around a leading edge of the airflow member, and back toward the trailing edge on another side of the airflow member.

15. The apparatus of claim 14, wherein the one side is a pressure side of the airflow member and the other side is a suction side of the airflow member.

16. An apparatus comprising:
a gas turbine engine cooled airfoil having an internal passageway formed between a first wall and a second wall, wherein the internal passageway is structured to pass cooling air; and
means for changing the direction of the cooling air in the internal passageway,
wherein in operation a flow of cooling fluid in the internal passageway is caused to move away from the first wall and along and over a first portion of the means for changing when encountering the first portion of the means for changing and to move away from the second wall and along and under a second portion of the means for changing when encountering the second portion of the means for changing, the flow of cooling fluid along the first portion of the means for changing being in a different direction than the flow of cooling fluid along the second portion of the means for changing.

17. The apparatus of claim 16, wherein the means for changing promotes flow separation in the passageway to increase heat transfer in the cooled airfoil.

18. A method comprising:
flowing a cooling air through a tortuous passage internal to a turbine airfoil component of a gas turbine engine, said tortuous passage being formed between a first wall and a second wall;
when encountering a first obstruction, turning the cooling air away from the first wall and along a length of and up and over the first obstruction; and
when encountering a second obstruction, routing the cooling air away from the second wall and along a length of and down and under the second obstruction.

19. The method of claim 18, which further includes splitting the cooling air with a leading edge of the first obstruction.

20. The method of claim 19, which further includes dividing the cooling air with a convergence of the first obstruction and the second obstruction.

21. The method of claim 18, which further includes inducing separated flow of the cooling air.

22. The method of claim 18, which further includes directing the cooling air from a pressure side of the turbine airfoil component, around a leading edge of the turbine airfoil component, and near a suction side of the turbine airfoil component.

* * * * *